(12) United States Patent
Van Haag

(10) Patent No.: US 6,204,487 B1
(45) Date of Patent: Mar. 20, 2001

(54) METHOD AND DEVICE FOR A PAPER CALENDER

(75) Inventor: Rolf Van Haag, Kerken (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/215,139

(22) Filed: Dec. 18, 1998

(30) Foreign Application Priority Data

Dec. 23, 1997 (DE) ............................................. 197 57 474

(51) Int. Cl.[7] .................................................... B21B 27/06
(52) U.S. Cl. ........................ 219/469; 219/216; 399/330; 118/60
(58) Field of Search ..................... 219/216, 469–471; 399/330–335; 432/60, 228; 492/46; 118/60

(56) References Cited

U.S. PATENT DOCUMENTS

| | | | |
|---|---|---|---|
| 4,416,719 | * 11/1983 | Horiuchi | 156/359 |
| 5,123,151 | * 6/1992 | Uehara et al. | 29/130 |
| 5,123,340 | 6/1992 | Kiema et al. | |
| 5,137,678 | * 8/1992 | Hess et al. | 264/280 |
| 5,331,385 | * 7/1994 | Ohtsuka et al. | 355/290 |
| 5,392,701 | * 2/1995 | Schiel | 100/93 RP |
| 5,481,349 | * 1/1996 | Satoh et al. | 355/290 |
| 5,655,444 | * 8/1997 | Kayser et al. | 100/334 |
| 5,770,298 | * 6/1998 | Nakamura et al. | 428/195 |
| 5,784,955 | * 7/1998 | Conrad | 100/329 |
| 5,895,598 | * 4/1999 | Kitano et al. | 219/619 |
| 5,902,503 | * 5/1999 | Buhrer et al. | 219/470 |
| 5,916,409 | * 6/1999 | Mosburger | 156/322 |
| 5,932,125 | * 8/1999 | Kawata et al. | 219/216 |
| 5,983,787 | 11/1999 | Linsuri et al. | |

FOREIGN PATENT DOCUMENTS

| | | |
|---|---|---|
| 2748123 | 5/1979 | (DE) . |
| 4026774 | 3/1992 | (DE) . |
| 19506301 | 8/1996 | (DE) . |
| 19506301A1 | * 8/1996 | (DE) . |
| 3937246 | 5/1999 | (DE) . |
| 2407292 | 5/1979 | (FR) . |
| 97/07281 | 2/1997 | (WO) . |
| 97/41298 | 11/1997 | (WO) . |

* cited by examiner

*Primary Examiner*—Teresa Walberg
*Assistant Examiner*—Shawntina Fuqua
(74) *Attorney, Agent, or Firm*—Greenblum & Bernstein, P.L.C.

(57) ABSTRACT

A method and device for a paper calender that includes at least one first roll, an elastic cover comprised of plastic, and at least one heatable roll. The at least one heatable roll is heatable by means of a heating device. The at least one heatable roll supports the elastic cover. In addition, the at least one first roll can likewise be made to be heatable so that the paper web can be supplied with heat from both sides.

45 Claims, 1 Drawing Sheet

METHOD AND DEVICE FOR A PAPER CALENDER

CROSS-REFERENCE TO RELATED APPLICATIONS

The present application claims priority under 35 U.S.C. §119 of German Patent Application No. DE 197 57 474.2, filed Dec. 23, 1997, the disclosure of which is expressly incorporated by reference herein in its entirety.

BACKGROUND OF THE INVENTION

1. Field of the Invention

The present invention relates to paper calenders, and more specifically to paper calenders with at least two rolls, one of which having an elastic cover made of plastic and one of which that may be heated by means of a heating device.

2. Discussion of Background Information

Currently, calenders exist that have one or a number of nips, which are defined on the one side, by means of a cast iron roll that can be heated and conducts heat well, and are defined on the other side by means of a roll that has an elastic cover. With the aid of the heating device, a part of the deforming energy is supplied as heat so that in many instances the mechanical deforming energy, which acts as a compressive strain in the nip, can be reduced. In addition, the heat cooperates with the smooth surface of the cast iron roll in such a way that the surface of the paper web is improved with regard to its properties such as brilliance, smoothness, or the like.

German patent DE 27 48 123 A1 discloses dissipating the undesirable heat, which is produced in an elastic cover by means of a flexing work, in such a way that fine metal particles are embedded in the plastic in order to improve the heat conductivity.

German patent DE 195 06 301 A1 discloses a two roll paper calender both one roll supports an elastic cover and the other roll is heated.

SUMMARY OF THE INVENTION

The present invention is directed to a method and device for a paper calender that substantially obviates one or more of the problems arising from the limitations and disadvantages of the related art.

It is an object of the present invention to provide a paper calender with at least two rolls, one of which has an elastic cover and one of which that may be heated, which permits novel combinations in the calender rolls.

Accordingly, one aspect of the present invention is directed to a paper calender that includes at least one first roll, an elastic cover made of plastic; and at least one heatable roll. The at least one heatable roll is heatable by means of a heating device. The at least one heatable roll supports the elastic cover.

According to another aspect of the present invention, the heating device heats the elastic cover from the inside, and the elastic cover contains dispersions of highly heat conductive material.

According to yet another aspect of the present invention, the heating device heats the elastic cover from the inside, and the elastic cover has a thickness of about 0.05 to 2 mm.

According to a further aspect of the present invention, the elastic cover has a thickness of about 0.1 to 1 mm.

According to another aspect of the present invention, the paper calender has a roll body that supports the elastic cover, and the roll body has peripherally extending heating medium conduits.

According to yet another aspect of the present invention, the heating medium is steam.

According to a further aspect of the present invention, the highly heat conductive material is made of metal.

According to another aspect of the present invention, the highly heat conductive material is made of carbon.

According to yet another aspect of the present invention, the dispersions have a component in the radial direction.

According to a further aspect of the present invention, the elastic cover contains dispersions of dark material, and the elastic cover is heated from the outside by means of IR radiation.

According to another aspect of the present invention, the dispersions of dark material contain paint pigments.

According to yet another aspect of the present invention, the elastic cover contains dispersions of material that can be magnetized, and the elastic cover is heated from the outside by means of an induction coil.

According to a further aspect of the present invention, the at least one heatable roll supporting the elastic cover forms a nip together with a second heatable roll.

According to another aspect of the present invention, the heating device containing an induction coil.

According to yet another aspect of the present invention, there is only a single nip.

According to a further aspect of the present invention, the elastic cover has an inner layer made of a first plastic and an outer layer made of a second plastic, the outer layer has a lesser elasticity and a greater hardness than the first plastic, as well as a smooth surface.

According to another aspect of the present invention, the inner layer made of a first plastic has dispersions of highly heat conductive material.

According to yet another aspect of the present invention, the at least one heatable roll supporting the elastic cover forms a nip with a deflection adjustment roll.

According to a further aspect of the present invention, the deflection adjustment roll has a roll jacket made of cast iron.

According to another aspect of the present invention, the deflection adjustment roll is pressed against the at least one heatable roll by support elements controlled in zones.

According to yet another aspect of the present invention, the plastic is polyester, epoxy, or phenol resins.

According to a further aspect of the present invention, the plastic is fiber-reinforced with fibers with high heat conductivity.

According to another aspect of the present invention, the fibers have high heat conductivity carbon fibers.

According to yet another aspect of the present invention, the invention is directed to a method for smoothing paper that includes supporting a plastic cover on a first roll, heating the first roll, pressing a second roll against the first roll forming a nip between the first roll and the second roll, and passing a paper web through the nip, the paper web is simultaneously heated and smoothed while passing through the nip.

According to a further aspect of the present invention, the heating includes heating by steam.

According to yet another aspect of the present invention, the heating includes heating by IR radiation.

According to a further aspect of the present invention, the invention includes heating from a heating source internal to the first roll, the heating source heating the inside of the plastic cover.

According to another aspect of the present invention, the invention includes heating dispersions of highly heat conductive material inside the plastic cover.

According to yet another aspect of the present invention, the invention includes heating from a heating source external to said first roll, the heating source heating the outside of the plastic cover.

According to a further aspect of the present invention, the invention includes heating dispersions of magnetizable material inside the plastic cover.

According to another aspect of the present invention, the invention includes heating the second roll.

According to yet another aspect of the present invention, the underside of the paper web is smoothed by a simultaneous supply of heat from above, and the top side of the paper web is smoothed by a simultaneous supply of heat from below.

According to a further aspect of the present invention, the invention includes controlling the pressing of a second roll against the first roll by support elements controlled in zones.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PRESENT INVENTION

Figure 1:
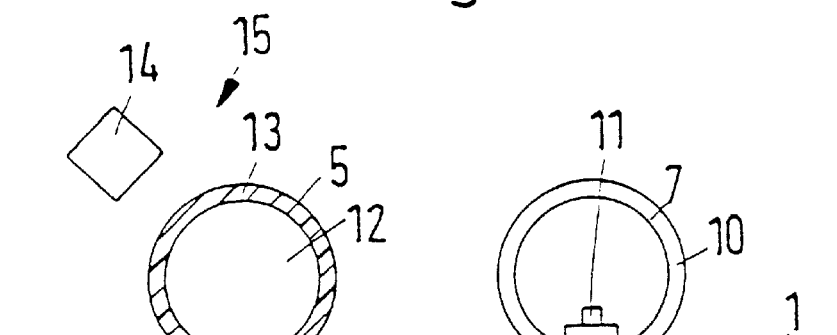
FIG. 1 is a schematic of an exemplary compact calender with two roll pairs according to the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In a paper calender according to the present invention, a heatable roll supports an elastic cover. In this connection, a roll whose elastic cover, (that prevents a black satination), is intended to provide for an even compression of the paper web, is simultaneously used to exert heat energy. The manufacturer has free choice as to the counter roll used. He can likewise heat the counter roll, or can use a roll that is difficult to heat, as is the case with a deflection adjusting roll with a cast iron jacket. The temperature primarily acts on the surface of the paper web which is oriented toward the elastic cover. This can be exploited so that the forces which provide for an even compression in the paper web lead to desired refining effects on the surface.

The plastics that may constitute the elastic cover have a reputation for being poor heat conductors. Therefore, if a plastic with a favorable heat conductivity is not used, additional measures must be taken which make the plastic suitable for the heat transmission into the paper web.

In a first preferred embodiment of a paper calender according to the present invention, the heating device heats the elastic cover from the inside. The elastic cover may contain intercalations or dispersions of highly heat conductive material, e.g. particles, fibers, or threads, in particular that may be made of metal, or that may be made of carbon or the like. An elastic cover of this kind permits the heat to easily pass from the inside to the outside of the elastic cover. Intercalations, or dispersions with a component in the radial direction are particularly favorable.

In another embodiment of a paper calender according to the present invention, the heating device heats the elastic cover from the inside and the elastic cover has a thickness of about 0.05 to 2 mm. In particular, the elastic cover may have a thickness of about 0.1 to 1 mm. With a cover of this kind, the insulation effect is only very slight. The heat is, therefore, conveyed very well to the paper web. Surprisingly, a thin covering layer suffices because its elasticity, in connection with the elasticity of the paper, is sufficient to even out the compression.

The internal heating preferably occurs by virtue of the fact that the roll body supporting the elastic cover has peripherally extending heating medium conduits. The heating medium, e.g. steam, travels in close proximity to the surface of the roll body so that the heat can be conveyed directly to the cover.

In a further embodiment of a paper calender according to the present invention, the elastic cover may contain intercalations or dispersions of dark material, and may be heated from the outside by means of IR radiation. In this instance, the heat is absorbed directly into the surface region of the cover and is transmitted to the paper web by an extremely short path.

In yet another embodiment of a paper calender according to the present invention, the elastic cover may contain intercalations or dispersions of material that can be magnetized, and may be heated from the outside by means of an induction coil. In this instance, the heat is generated within the cover and can, therefore, be transmitted to the paper web in a likewise favorable manner.

In a paper calender according to the present invention, it is desired that the heatable roll that supports the elastic cover constitutes a nip together with a second heatable roll. The paper web is, therefore, supplied with heat energy from both sides, which is very favorable for the satination process. Therefore, a better satination result or the same satination result can be achieved with a smaller number of rolls.

The increased supply of heat energy allows the desired satination effect to be achieved when there is only a single nip. This result is achieved because the elastic cover has an inner layer of a first plastic and an outer layer of a second plastic, and the outer layer has a lesser elasticity and a greater hardness than the first plastic, as well as a smooth surface. The smooth surface of the outer plastic layer and the smooth metallic surface of a neighboring roll, as well as the heat supply from both sides, produces a refined paper that has largely equivalent properties on both sides.

In another embodiment of a paper calender according to the present invention, the heatable roll, which is provided with an elastic cover, forms a nip with a deflection adjustment roll. A deflection adjustment roll of this kind permits the compressive strain in the nip to be kept largely uniform. It does not absolutely have to be heated because heat can in fact be supplied by way of the other roll.

In FIG. 1, a paper web 1 passes through two roll pairs. The nip 2 is defined by the roll pair of rolls 4 and 5, and the nip 3 is defined by the roll pair of rolls 6 and 7. The roll 4 is a deflection adjustment roll, which has a roll jacket 8 of cast iron. Roll 4 may be pressed against the other roll 5 by means of support elements 9, which may be controlled in zones. Roll 7 is also a deflection adjustment roll with a roll jacket 10 and support elements 11.

Roll 5 has a cylindrical roll body 12, which supports an elastic cover 13 that may be made of plastic. This plastic may have intercalations or dispersions of dark, in particular black, material, for example paint pigments. On the outside, an IR emitter 14 is provided, whose radiation is absorbed by the dispersions and is transmitted as heat to the paper web 1. IR emitter 14 therefore constitutes an external heating source or device 15. Roll 6, in turn, has a roll body 16 and may have an elastic cover 17 that may contain dispersions of material that can be magnetized, for example, metal such as iron. An induction coil 18 generates heat in the dispersions that can be magnetized, which is then transmitted to paper web 1. Induction coil 18 therefore constitutes an external heating source or device 19 in this instance as well.

In nip 2, the underside of the paper web 1 is smoothed by the simultaneous supply of heat from above. In nip 3, the top side of the paper web 1 is smoothed by the simultaneous supply of heat from below.

Figure 2:
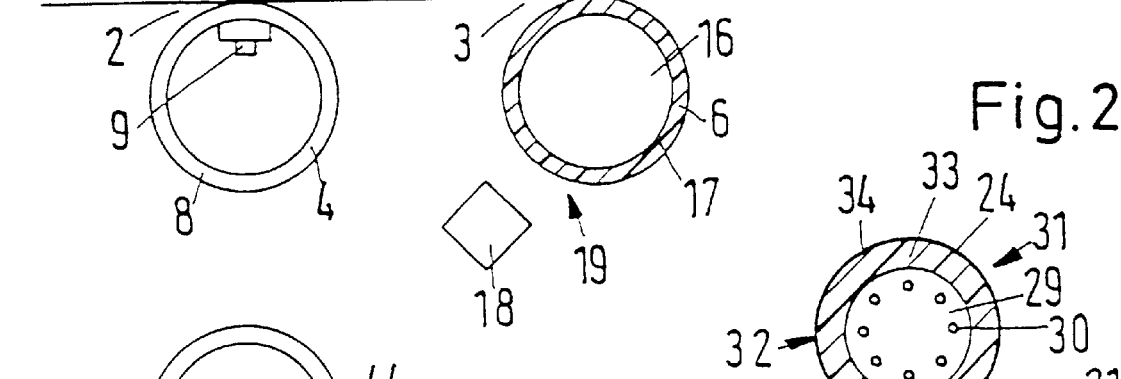
FIG. 2 is a schematic of an exemplary compact calender with only one roll pair according to the present invention.

FIG. 2 shows an embodiment of a paper calender, according to the present invention, where paper web 21 travels through a nip 22, which is defined by rolls 23 and 24. Roll 23 has a roll body 25, which has a large number of peripheral, axial conduits 26, through which a heat carrier such as steam can flow. Roll 23 supports an extremely thin elastic cover 27, which may have a thickness of about 0.5 to 2 mm, preferably about 0.1 to 1 mm. Due to the small distance of the conduits 26 from the circumference, and due to the small thickness of cover 27, a considerable heat flow from the bottom roll 25 to the paper web 21 occurs. In this instance, therefore, an internal heating source or device 28 is produced. Roll 24 has a roll body 29 which may be provided with peripheral, axial conduits 30 for the passage of a heat carrier so that in turn, an internal heating source or device 31 is produced. Roll body 29 supports an elastic cover 32, which may be comprised of an inner layer 33 and an outer layer 34. The inner layer 33 may have a plastic that contains dispersions of highly heat conductive material. The outer layer 34 may be comprised of a second plastic, but has only a small thickness similar to that of cover 27. As a whole, therefore, a sufficient heat flow from conduits 30 to the paper web 21 occurs. Furthermore, outer layer 34 has a smooth surface, and has a lesser elasticity and a greater hardness than the first plastic of inner layer 33. Since cover 27 may also be given a similarly smooth surface, in many instances, a sufficient paper refining is already produced after the passage through a single nip 22, wherein it is essential that the paper web 21 is supplied with heat from both sides.

Figure 3:
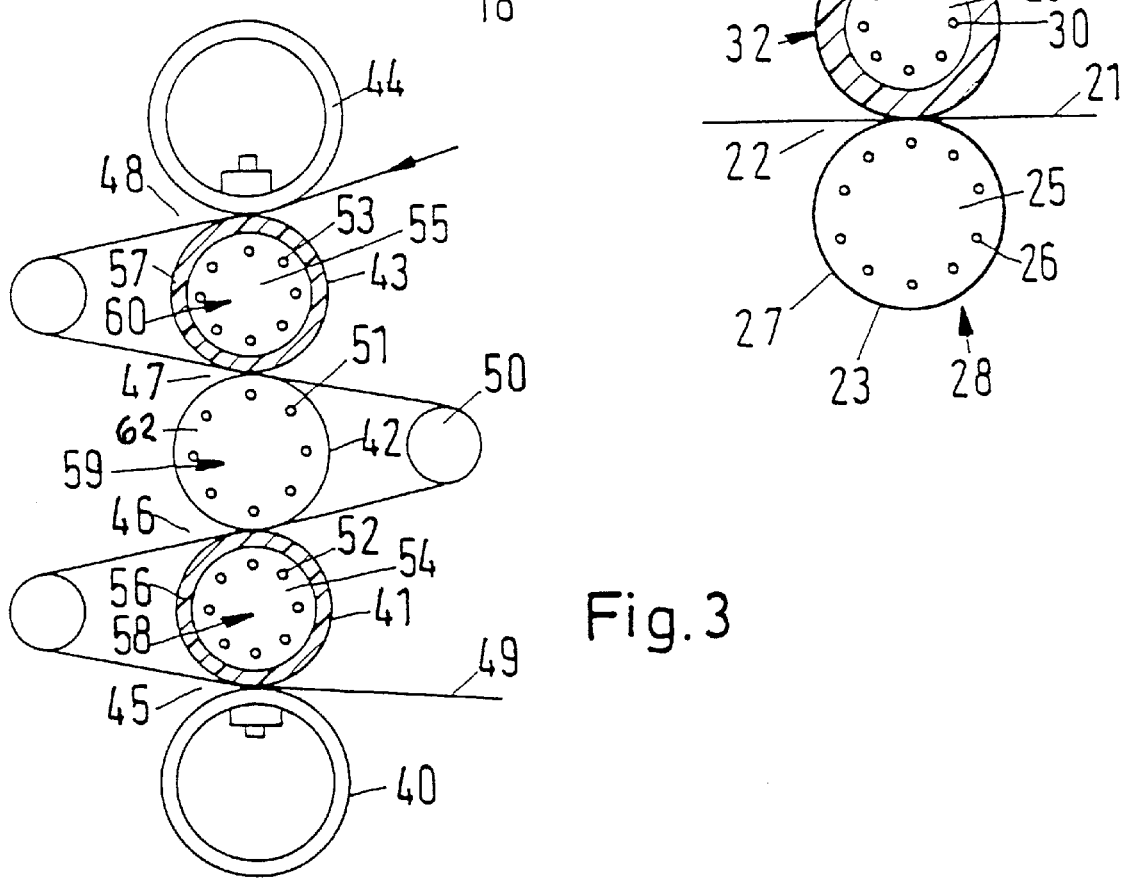
FIG. 3 is a schematic of an exemplary five-roll calender according to the present invention.

FIG. 3 shows an embodiment of a paper calender, according to the present invention, where a stack of five rolls 40, 41, 42, 43 and 44 form a total of four nips 45, 46, 47 and 48, which a paper web 49 passes through in succession. Paper web 49 is deflected by guide rolls 50. The bottom roll 40 and the top roll 44 may be embodied as deflection adjustment rolls similar to rolls 4 and 7 of FIG. 1. Middle roll 42 may be a hard roll with a unitary roll body 62, which has a large number of peripheral, axial conduits 51 for the passage of a heat carrier. Middle rolls 41 and 43 have roll bodies 54 and 55 respectively that may be provided with similar conduits 52 and 53. Middle rolls 41 and 43 each support an elastic cover 56 and 57 respectively, which presents only a slight resistance to the heat flow to paper web 49 by means of dispersions of highly heat conductive material. The three rolls 41, 42, and 43, therefore, each have an internal heating source or device 58, 59 and 60.

A large number of materials may be used as plastics for the elastic cover according to the present invention, for example: polyester, epoxy, or phenol resins, possibly fiber-reinforced, wherein fibers with high heat conductivity such as carbon fibers are preferable.

The embodiments shown are only intended to aid in general understanding of a paper calender according to the present invention. The individual rolls may be combined or exchanged with one another, depending on the paper quality desired, and still be within the spirit and scope of the present invention. In particular, a roll stack may also consist of fewer or more rolls than the five-roll calender in FIG. 3, and can in particular have two to twelve rolls and be within the spirit and scope of the present invention.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular means, materials, and embodiments, the present invention is not intended to be limited to the particulars disclosed herein; rather, the present invention extends to all functionally equivalent structures, methods and uses, such as are within the scope of the appended claims.

What is claimed is:

1. A paper calender comprising:
   at least one hard roll having a coating-free outer surface;
   at least one elastic cover, said at least one elastic cover comprised of plastic; and
   at least one heatable roll, said at least one heatable roll heatable by a heating device, at least one of said at least one heatable roll supporting said at least one elastic cover.

2. The paper calender according to claim 1, the heating device heating said at least one elastic cover from the inside, said at least one elastic cover containing dispersions of highly heat conductive material.

3. The paper calender according to claim 1, the heating device heating said at least one elastic cover from the inside, said at least one elastic cover having a thickness of about 0.05 to 2 mm.

4. The paper calender according to claim 3, said at least one elastic cover having a thickness of about 0.1 to 1 mm.

5. The paper calender according to claim 2, comprising a roll body that supports said at least one elastic cover, the roll body having peripherally extending heating medium conduits.

6. The paper calender according to claim 5, the heating medium comprising steam.

7. The paper calender according to claim 2, the highly heat conductive material comprising metal.

8. The paper calender according to claim 2, the highly heat conductive material comprising carbon.

9. The paper calender according to claim 2, the dispersions comprising a component in the radial direction.

10. The paper calender according to claim 1, the elastic cover containing dispersions of dark material, for heating from the outside by means of IR radiation.

11. A paper calender comprising:
at least one first roll;
at least one elastic cover, said at least one elastic cover comprised of plastic;
at least one heatable roll, said at least one heatable roll heatable by a heating device, at least one of said at least one heatable roll supporting said at least one elastic cover;
the elastic cover containing dispersions of dark material, for heating from the outside by means of IR radiation; and
the dispersions of dark material comprising paint pigments.

12. A paper calender comprising:
at least one first roll;
at least one elastic cover, said at least one elastic cover comprised of plastic;
at least one heatable roll, said at least one heatable roll heatable by a heating device, at least one of said at least one heatable roll supporting said at least one elastic cover; and
the at least one elastic cover containing dispersions of magnetizable material, the at least one elastic cover being heated from the outside by means of an induction coil.

13. The paper calender according to claim 1, the at least one of said at least one heatable roll supporting said at least one elastic cover forming a nip together with a second heatable roll.

14. The paper calender according to claim 1, the heating device comprising an induction coil.

15. The paper calender according to claim 13, comprising only a single nip.

16. The paper calender according to claim 15, said at least one elastic cover comprising an inner layer made of a first plastic and an outer layer made of a second plastic, the outer layer having a lesser elasticity and a greater hardness than the first plastic, as well as a smooth surface.

17. The paper calender according to claim 16, the inner layer made of a first plastic comprising dispersions of highly heat conductive material.

18. The paper calender according to claim 1, said at least one heatable roll supporting said at least one elastic cover forming a nip with a deflection adjustment roll.

19. The paper calender according to claim 18, the deflection adjustment roll comprising a roll jacket made of cast iron.

20. The paper calender according to claim 18, the deflection adjustment roll being pressed against said at least one heatable roll by support elements controlled in zones.

21. The paper calender according to claim 2, the plastic comprising one of polyester, epoxy, and phenol-resins.

22. The paper calender according to claim 21, the plastic being fiber-reinforced with fibers with high heat conductivity.

23. The paper calender according to claim 22, the fibers comprising high heat conductivity carbon fibers.

24. The paper calender according to claim 1, the heating device comprising IR radiation.

25. A method for smoothing paper comprising:
supporting a plastic cover containing dispersions of magnetizable material on a first roll;
heating the plastic cover of the first roll from the outside by an induction coil;
pressing a second roll against the first roll forming a nip between the first roll and the second roll; and
passing a paper web through the nip, the paper web being simultaneously heated and smoothed while passing through the nip.

26. The method according to claim 25, said heating comprising heating by steam.

27. The method according to claim 25, said heating comprising heating by IR radiation.

28. The method according to claim 25, comprising heating from a heating source internal to said first roll, the heating source heating the inside of the plastic cover.

29. The method according to claim 28, comprising heating dispersions of highly heat conductive material inside the plastic cover.

30. The method according to claim 25, comprising heating from a heating source external to said first roll, the heating source heating the outside of the plastic cover.

31. The method according to claim 25, comprising heating the second roll.

32. The method according to claim 31, the underside of the paper web being smoothed by a simultaneous supply of heat from above, the top side of the paper web being smoothed by a simultaneous supply of heat from below.

33. The method according to claim 25, comprising controlling the pressing a second roll against the first roll by support elements controlled in zones.

34. A paper calender comprising:
at least one first roll;
at least one elastic cover, said at least one elastic cover being a plastic containing dispersions of paint pigments, for heating from the outside; and
at least one heatable roll, said at least one heatable roll being heatable by an IR heating device, at least one of said at least one heatable roll supporting said at least one elastic cover.

35. A paper calender comprising:
at least one hard roll having a coating-free outer surface;
at least one elastic cover, said at least one elastic cover being a plastic containing dispersions of magnetizable material;
at least one heatable roll, said at least one heatable roll, at least one of said at least one heatable roll supporting said at least one elastic cover; and
an induction coil that heats said magnetizable material.

36. A method for smoothing paper comprising:
providing an elastic cover containing dispersions of dark material, on a first roll;
heating said elastic cover from the outside by means of IR radiation;
pressing a second roll against the first roll to form a nip between the first roll and the second roll, said second roll comprising a hard roll having a coating-free outer surface; and
passing a paper web through the nip, the paper web being simultaneously heated and smoothed while passing through the nip.

37. A method for smoothing paper comprising:

providing an elastic cover containing dispersions of dark material, on a first roll;

heating said elastic cover from the outside by means of IR radiation;

pressing a second roll against the first roll to form a nip between the first roll and the second roll; and passing a paper web through the nip, the paper web being simultaneously heated and smoothed while passing through the nip;

wherein said dark material comprises paint pigments.

38. A paper calender comprising:

at least one hard roll having a coating-free outer surface;

at least one elastic cover, said at least one elastic cover being a plastic containing dispersions of magnetizable material, for heating from the outside; and at least one heatable roll, said heatable roll being heatable by an induction coil, at least one of said at least one heatable roll supporting said at least one elastic cover.

39. The paper calender according to claim 1, wherein said at least one elastic cover comprises a one-layer configuration.

40. The paper calender according to claim 7, the heating device heating said at least one elastic cover from the inside, said at least one elastic cover having a thickness of about 0.05 to 2 mm.

41. The paper calender according to claim 40, said at least one elastic cover having a thickness of about 01. to 1 mm.

42. The paper calender according to claim 8, the heating device heating said at least one elastic cover from the inside, said at least one elastic cover having a thickness of about 0.05 to 2 mm.

43. The paper calender according to claim 42, said at least one elastic cover having a thickness of about 01. to 1 mm.

44. The paper calender according to claim 21, the heating device heating said at least one elastic cover from the inside, said at least one elastic cover having a thickness of about 0.05 to 2 mm.

45. The paper calender according to claim 44, said at least one elastic cover having a thickness of about 01. to 1 mm.

* * * * *